(12) United States Patent
Hansen et al.

(10) Patent No.: US 10,590,568 B2
(45) Date of Patent: Mar. 17, 2020

(54) ULTRA-RESILIENT FABRIC

(75) Inventors: Robert A. Hansen, Stuttgart-Birkach (DE); Bjorn Rydin, Horby (SE); Glenn Kornett, Bonneau, SC (US)

(73) Assignee: Albany International Corp., Rochester, NH (US)

( * ) Notice: Subject to any disclaimer, the term of this patent is extended or adjusted under 35 U.S.C. 154(b) by 1342 days.

(21) Appl. No.: 12/345,466

(22) Filed: Dec. 29, 2008

(65) Prior Publication Data
US 2009/0176427 A1 Jul. 9, 2009

Related U.S. Application Data

(60) Provisional application No. 61/017,484, filed on Dec. 28, 2007.

(51) Int. Cl.
| | |
|---|---|
| B32B 5/12 | (2006.01) |
| D03D 7/00 | (2006.01) |
| D21F 7/08 | (2006.01) |
| D03D 15/08 | (2006.01) |
| D21F 3/02 | (2006.01) |
| D21F 1/00 | (2006.01) |
| D03D 13/00 | (2006.01) |
| B65G 15/34 | (2006.01) |

(52) U.S. Cl.
CPC ............ *D03D 7/00* (2013.01); *D03D 13/004* (2013.01); *D03D 15/08* (2013.01); *D21F 1/0036* (2013.01); *D21F 3/0227* (2013.01); *D21F 7/083* (2013.01); *D21F 7/086* (2013.01); *B65G 15/34* (2013.01); *Y10T 442/3024* (2015.04)

(58) Field of Classification Search
CPC ............ B32B 2250/03; B32B 2250/20; B32B 2250/24; B32B 2250/40; B32B 2262/0262; B32B 305/10; B32B 307/56; B32B 2413/00; B32B 2433/02; B32B 2433/04; B32B 5/12
USPC ......... 442/50, 328, 329, 334, 335, 338, 366, 442/381, 389, 392, 414, 415, 416
See application file for complete search history.

(56) References Cited

U.S. PATENT DOCUMENTS

| | | | | |
|---|---|---|---|---|
| 2,919,217 A | * | 12/1959 | Bobkowicz | .................. 428/108 |
| 2,919,467 A | * | 1/1960 | Mercer | ............... B29C 47/0033 |
| | | | | 156/167 |
| 3,316,136 A | * | 4/1967 | Pufahl | .................. D06M 17/00 |
| | | | | 156/160 |

(Continued)

FOREIGN PATENT DOCUMENTS

| | | |
|---|---|---|
| CN | 1914373 B | 5/2010 |
| DE | 42 02 325 A | 8/1993 |

(Continued)

OTHER PUBLICATIONS

Definition "loom" Complete Textile Glossary, Celanese Acetate LLC, Copyright 2001.*

(Continued)

*Primary Examiner* — Andrew T Piziali
(74) *Attorney, Agent, or Firm* — McCarter & English, LLP

(57) ABSTRACT

A structure for use in industrial fabrics such as paper machine clothing and engineered fabrics. The structure contains both axially elastomeric yarns and relatively inelastic yarns in various patterns. The structure has a high degree of both compressibility under an applied normal load and excellent recovery (resiliency or spring back) upon removal of that load.

10 Claims, 11 Drawing Sheets

(56) References Cited

U.S. PATENT DOCUMENTS

| | | | |
|---|---|---|---|
| 3,384,692 A * | 5/1968 | Galt | B29C 47/0033 156/167 |
| 3,537,928 A * | 11/1970 | Maglio | D06N 3/005 156/220 |
| 3,553,857 A | 1/1971 | Isham et al. | |
| 3,723,218 A * | 3/1973 | Gaffney | B29C 47/0033 156/167 |
| 3,733,721 A | 5/1973 | Clemens | |
| 3,815,645 A | 6/1974 | Codorniu | |
| 4,088,805 A * | 5/1978 | Wiegand | B29C 44/12 442/370 |
| 4,328,840 A * | 5/1982 | Fontana | 139/419 |
| 4,328,841 A * | 5/1982 | Fontana | 139/419 |
| 4,350,731 A | 9/1982 | Siracusano | |
| 4,555,440 A | 11/1985 | Crook | |
| 4,608,768 A | 9/1986 | Cavanagh | |
| 4,781,967 A | 11/1988 | Legge et al. | |
| 4,791,863 A * | 12/1988 | Vahatalo | 100/35 |
| 4,870,998 A * | 10/1989 | Westhead | 139/383 A |
| 4,931,358 A | 6/1990 | Wahl et al. | |
| 4,979,543 A | 12/1990 | Moriarty et al. | |
| 5,087,327 A | 2/1992 | Hood | |
| 5,360,656 A | 11/1994 | Rexfelt et al. | |
| 5,368,696 A | 11/1994 | Cunnane, III et al. | |
| 5,401,564 A | 3/1995 | Lee et al. | |
| 5,436,052 A * | 7/1995 | Basse | B21F 27/20 428/105 |
| 5,480,646 A | 1/1996 | Vu | |
| 5,560,401 A * | 10/1996 | Miglus | 139/383 R |
| 5,597,450 A | 1/1997 | Baker et al. | |
| 6,001,460 A * | 12/1999 | Morman | B32B 5/04 428/195.1 |
| 6,039,821 A | 3/2000 | Buck | |
| 6,146,499 A * | 11/2000 | Lin et al. | 162/197 |
| 6,158,576 A * | 12/2000 | Eagles | B65G 43/02 198/810.01 |
| 6,179,965 B1 | 1/2001 | Cunnane, III et al. | |
| 6,391,420 B1 * | 5/2002 | Cederblad et al. | 428/107 |
| 6,413,889 B1 | 7/2002 | Best et al. | |
| 6,723,208 B1 | 4/2004 | Hansen | |
| 2002/0072290 A1 | 6/2002 | Johnson | |
| 2002/0100572 A1 | 8/2002 | Cunnane, III | |
| 2002/0162246 A1 | 11/2002 | Mayer et al. | |
| 2003/0217484 A1 | 11/2003 | Christensen et al. | |
| 2003/0228815 A1 | 12/2003 | Bhatnagar et al. | |
| 2004/0005832 A1 | 1/2004 | Neculescu et al. | |
| 2004/0023582 A1 | 2/2004 | Espe | |
| 2004/0219854 A1 | 11/2004 | Groitzsch et al. | |
| 2005/0081570 A1 | 4/2005 | Karlsson et al. | |
| 2006/0029772 A1 | 2/2006 | Huang et al. | |
| 2006/0278328 A1 | 12/2006 | Westerkamp et al. | |
| 2007/0163741 A1 | 7/2007 | Crook | |
| 2007/0194490 A1 | 8/2007 | Bhatnagar et al. | |
| 2007/0202314 A1 | 8/2007 | Youn et al. | |
| 2008/0166533 A1 | 7/2008 | Jones et al. | |
| 2009/0176427 A1 | 7/2009 | Hansen et al. | |
| 2009/0181590 A1 | 7/2009 | Hansen et al. | |
| 2010/0129597 A1 | 5/2010 | Hansen et al. | |
| 2012/0189806 A1 | 7/2012 | Hansen et al. | |

FOREIGN PATENT DOCUMENTS

| | | |
|---|---|---|
| DE | 10 2004 038770 | 2/2006 |
| EP | 0306313 A | 3/1989 |
| EP | 0505788 A | 3/1992 |
| EP | 1302578 A | 4/2003 |
| EP | 1386723 A | 2/2004 |
| EP | 1568808 A | 8/2005 |
| EP | 1 719 834 A | 11/2006 |
| GB | 1118784 | 7/1968 |
| GB | 2197886 A | 6/1988 |
| JP | 2003-193326 A | 7/2003 |
| WO | WO 93/17180 A | 9/1993 |
| WO | WO 2004/005018 A | 1/2004 |
| WO | WO 2004/072368 A | 8/2004 |
| WO | WO 2005/075734 A | 8/2005 |
| WO | WO 2007/067949 A | 6/2007 |
| WO | WO 2009/086533 A | 7/2009 |
| WO | WO 2010/030298 A | 3/2010 |

OTHER PUBLICATIONS

BPAI Decision on Appeal, U.S. Appl. No. 10/699,997, mailed Dec. 19, 2011.*
Definition "laminated" Merriam-Webster Dictionary, https://www.merriam-webster.com/dictionary/laminated.*
Definition of "Needle Loom" Complete Textile Glossay, Celanese Acetate, 2001.*
Definition of "soft" Webster's New World College Dictionary, Wiley Publishing, 2010.*
International Search Reportand Written Opinion from EPO for PCT/US2008/088478 dated Jul. 2, 2009.
International Search Reportand Written Opinion from EPO for PCT/US2008/088450 dated Apr. 15, 2009.
International Search Reportand Written Opinion from EPO for PCT/US2010/036398 dated Sep. 15, 2010.
International Search Reportand Written Opinion from EPO for PCT/US2010/036385 dated Oct. 7, 2010.
International Search Reportand Written Opinion from International Application PCT/US2012/022029.
International Search Reportand Written Opinion from International Application PCT/US2012/022035.
Notification of First Office Action, including search report, issued by Chinese Patent Office for corresponding Chinese application 201280009844.1 dated Sep. 3, 2014, English translation only.
Dell'Isola, Francesco et al.: "A Two-Dimensional Gradient-Elasticity Theory for Woven Fabrics", *Journal of Elasticity, The Physical and Mathematical Science of Solids*, Jan. 2015, pp. 113-125, vol. 118, No. 1.
Gu, Huang: "Tensile behaviours of woven fabrics and laminates", *Materials and Designs*, 2007, pp. 704-707, vol. 28, issue 2.
Homaeigohar, Seyed Shahin et al.: "Novel compaction resistant and ductile nanocomposite nanofibrous microfiltration membranes, *Journal of Colloid and Interface Science*", Apr. 15, 2012, pp. 6-15, vol. 372.
Gonca, V. et al.: "Theoretical and Experimental Studies of Stiffness Properties of Laminated Elastomeric Structures", presented at 9th International DAAAM Baltic Conference "Industrial Engineering", Apr. 24-26, 2014 in Tallinn, Estonia, pp. 342-347.
Woodford, Chris, "Composites and laminates", *Explainthatstuff!*, Jul. 13, 2015, http://www.explainthatstuff.com/composites.html ; accessed on Nov. 20, 2015.
"Non Wovens and Laminates Make Their Way Into Press Felts", *Pulp & Paper Canada*, Feb. 29, 2000, http://www.pulpandpapercanada.com/innovation/non-wovens-and-laminates-make-their-way-into-press-felts-1000107127 ; accessed on Nov. 20, 2015.
"Woven Fabrics", *NetComposites Now*, published courtesy of David Cripps, Gurit, http://www.netcomposites.com/guide-tools/guide/reinforcements/woven-fabrics/ , accessed on Nov. 20, 2015.
Kaw, Autar K.: *Mechanics of Composite Materials 2nd Ed.*, 2006, pp. 52-53, Taylor and Francis Group. https://books.google.com/books?id=MwHLBQAAQBAJ&pg=PA53&lpg=PA53&dq=%22what+is+a+laminate%22+-floor&source=bl&ots=0RHWB8ye64&sig=cDYgwldYguJag18GoXdiG4ZLQIM&hl=en&sa=X&ved=0CCMQ6AEwAWoVChMI3_-p9pCdyQIVzL1eCh22CABs#v=onepage&q=%22what%20is%20a%20laminate%22%20-floor&f=false.

* cited by examiner

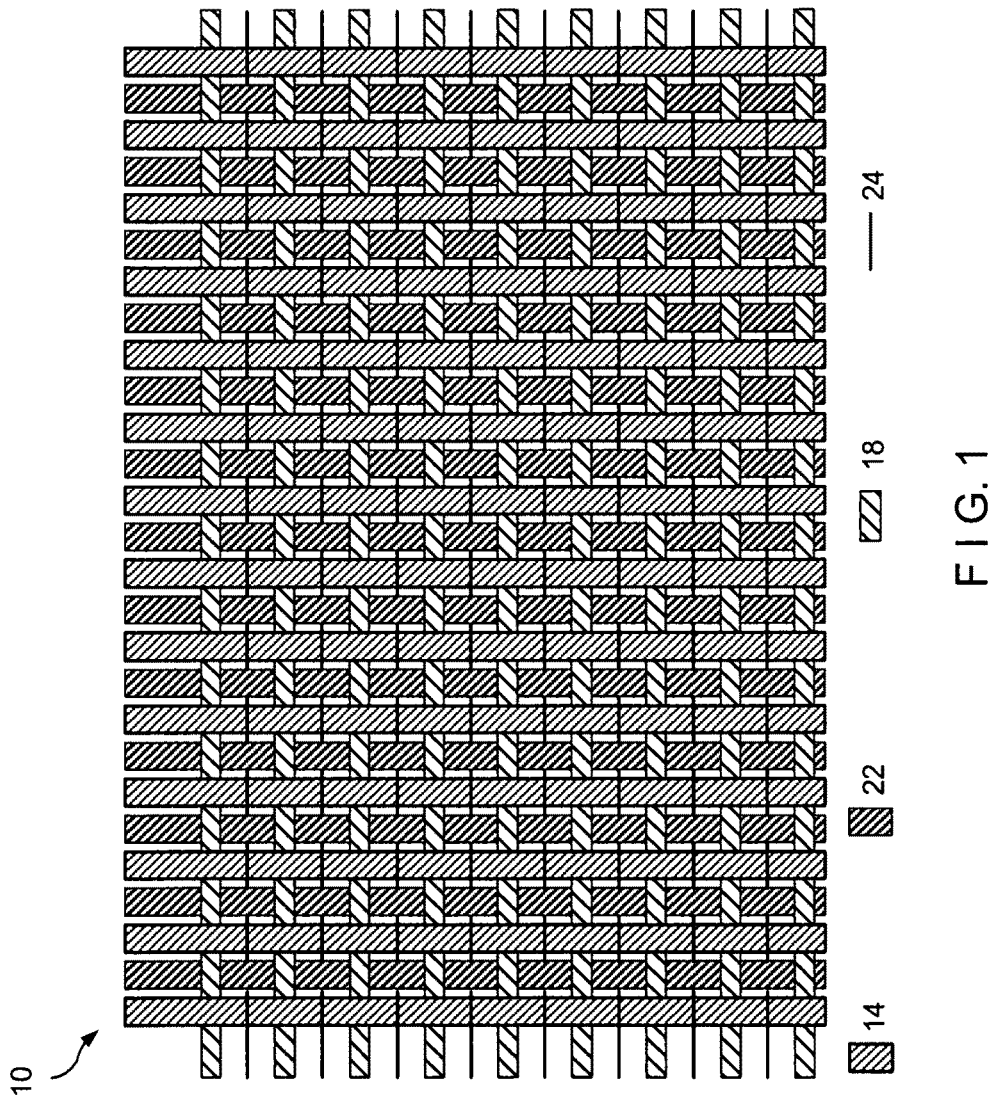

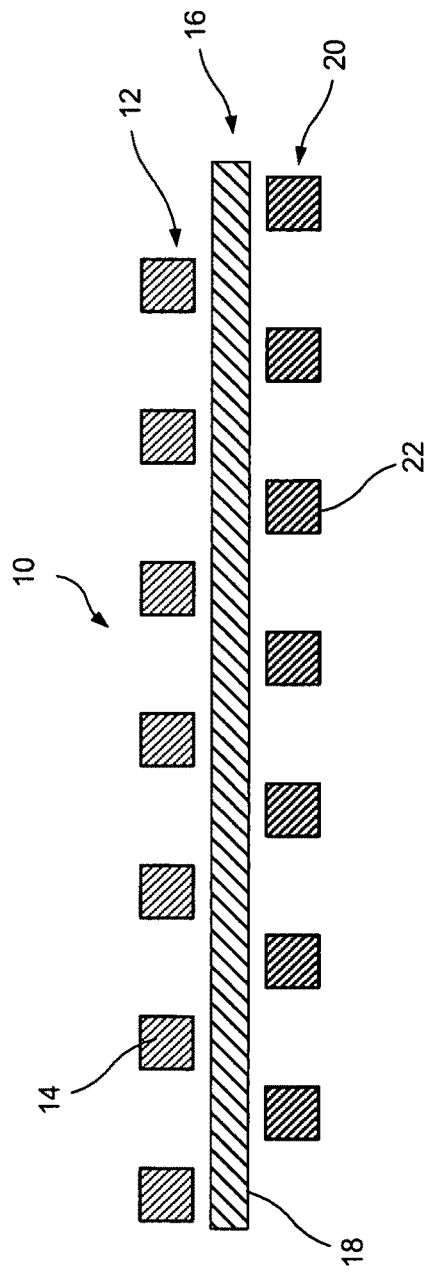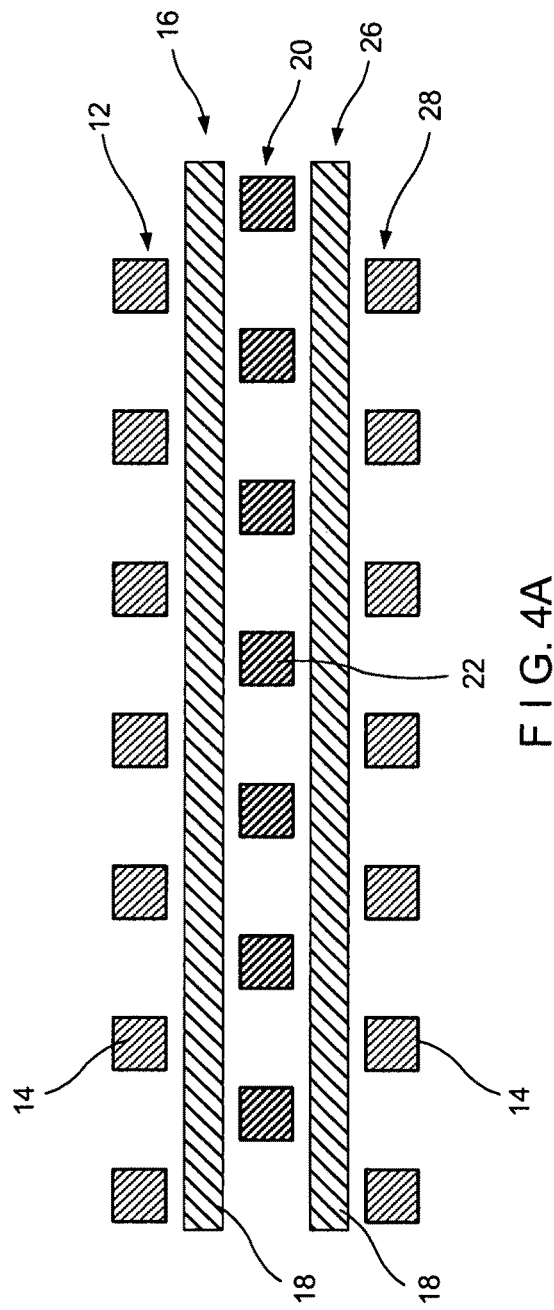

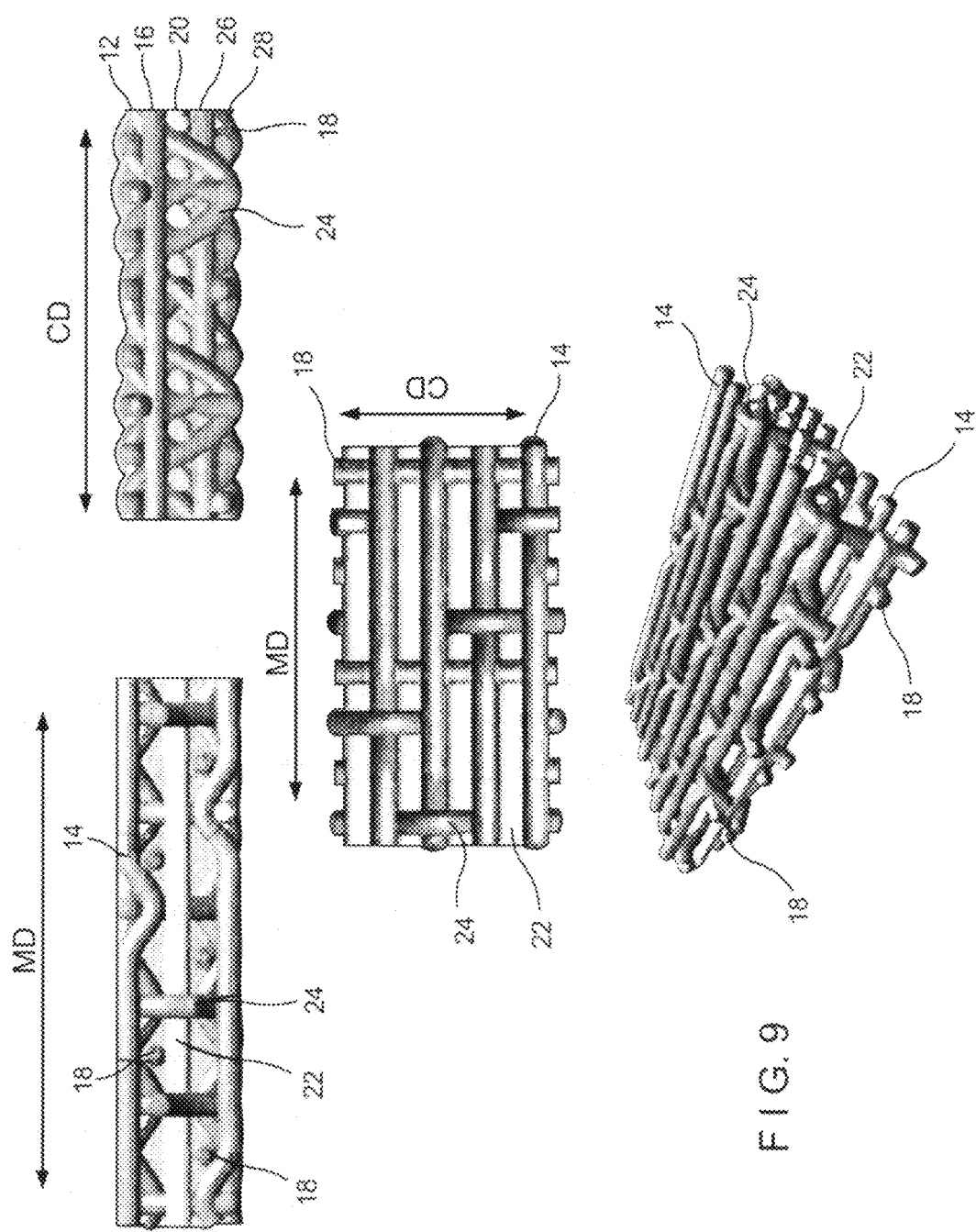

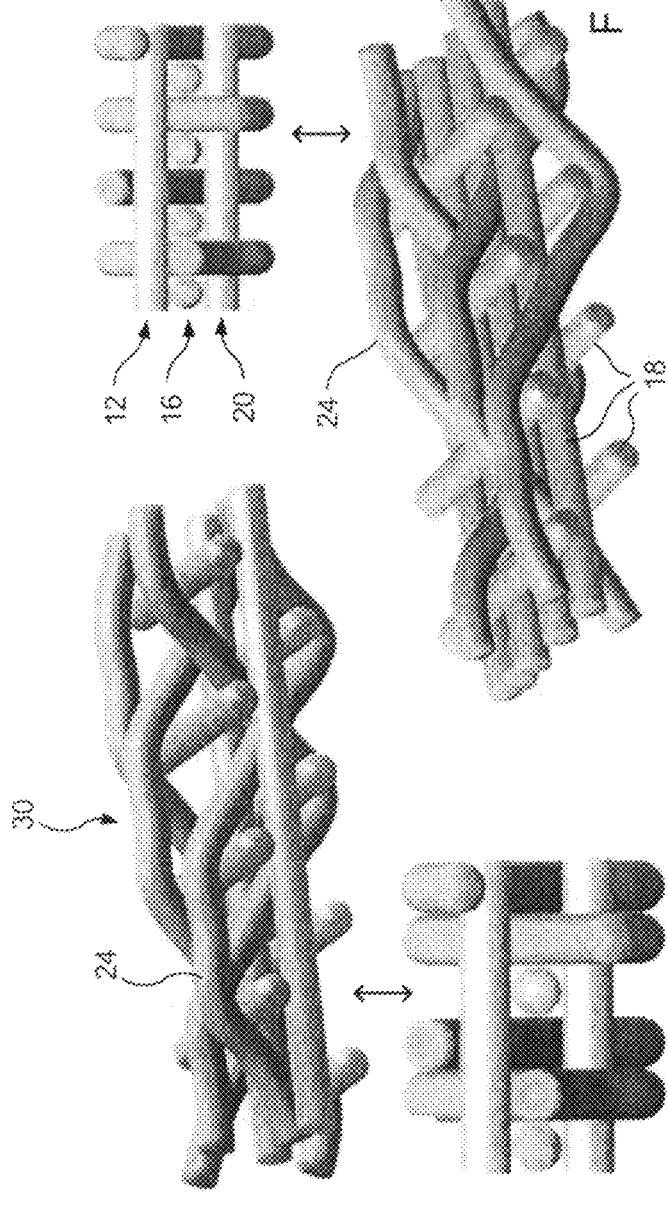
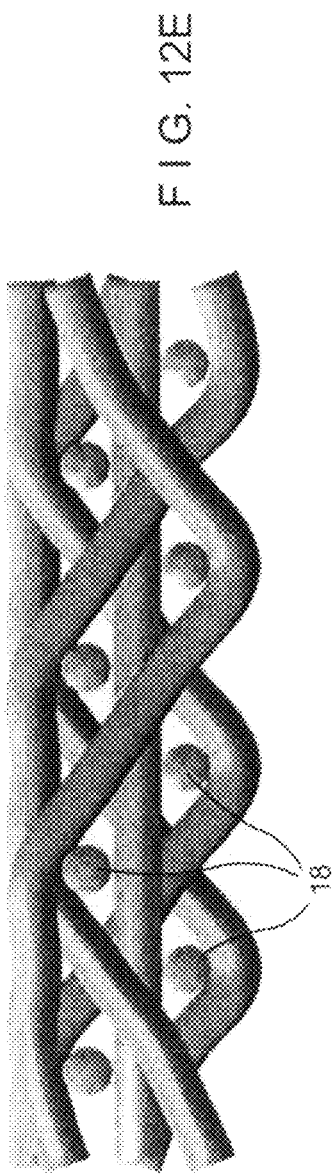
FIG. 12A
FIG. 12B
FIG. 12C
FIG. 12D
FIG. 12E

ULTRA-RESILIENT FABRIC

CROSS-REFERENCE TO RELATED APPLICATION

This application claims priority benefits of U.S. Provisional Patent Application Ser. No. 61/017,484 filed Dec. 28, 2007, the disclosure of which is incorporated herein by reference.

FIELD OF THE INVENTION

The present invention relates to a structure for use in industrial fabrics such as paper machine clothing and engineered fabrics. More specifically, the structure contains both elastomeric (in the length or axial direction) yarns and relatively inelastic yarns in various patterns. Such a structure has a high degree of both compressibility under an applied normal load and excellent recovery (resiliency or spring back) upon removal of that load.

BACKGROUND OF THE INVENTION

Industrial fabrics means an endless structure in the form of a continuous loop such as one used as a forming, press or dryer fabric (paper machine clothing or PMC) as well as a process belt such as a shoe press, calendar, or transfer belt used on a paper machine. Industrial fabrics also means a fabric used in textile finishing processes. Industrial fabrics also include other endless belts where a high degree of compressibility and resiliency is required.

While the discussion herein concerns for the most part the papermaking process in general, the application of the invention is not considered limited thereto.

In this regard, during the papermaking process, for example, a cellulosic fibrous web is formed by depositing a fibrous slurry, that is, an aqueous dispersion of cellulose fibers, onto a moving forming fabric in a forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

Base fabrics, which form an important portion of the above discussed fabrics, take many different forms. For example, they may be woven either endless or flat woven and subsequently rendered into endless form with a woven seam using one or more layers of machine direction (MD) and cross machine direction (CD) yarns. Also such fabrics may employ what is referred to as a pin seam also formed from MD yarns to allow installation on the paper machine. Further, the base fabrics may be laminated by placing one base fabric within the endless loop formed by another base fabric, and joining or laminating them together by various means known to those skilled in the art such as by needling staple fiber batt through both base fabrics to join them to one another.

In paper machine clothing (PMC) especially press fabrics used in the press section of a paper machine, the fabric has one or more "base structures" formed from yarns and staple fiber batt needled into usually at least the sheet contact surface. The press fabric has an initial thickness, mass, and consequent void volume (the calculated volume based upon this mass and thickness) which equates to water handling capacity. They also have a measurable contact area.

Since press fabrics are subjected to normal loads (normal to the fabric plane in use) as it passes through one or more press nips, the fabric, since it is compressible itself and contains compressible components, has a compressed void volume and surface contact area as well. While there have been various attempts to change the degree of compressibility, and to introduce a degree of resiliency (spring or bounce back), press fabrics become progressively thinner over time and millions of nip cycles. Eventually they must be removed due to various reasons such as lack of water handling capability, marking, or press vibration. When they have reached the end of their useful lifetime and they must be removed and replaced with a new fabric.

New fabrics also go through a break in period wherein the density is not ideal and water handling is less than optimum. Accordingly, an ideal press fabric is one that has constant or steady state performance (for example water handling capability) from day one until it is removed from the paper machine.

Various attempts have been made to affect press fabric properties, especially compressibility and resiliency. One attempt has been to introduce "elastic" yarns into structures. These yarns are elastic in the thickness or radial direction (if round), and can be elastic in the length or axial direction as well.

One example of this is seen in PCT application WO 2004/072368 A1. There are shortcomings to this approach however. The compressibility is only due to the elastic portion (in the through thickness direction) of the yarn, and is therefore limited to such. While larger yarns can be used, there is eventually a diminishing return on performance. Also large yarns are heavy, and can cause objectionable sheet marking. If the yarn is a sheath/core type, there is always the danger of delamination of the sheath from the core. Finally, the degree of compressibility is limited to a maximum of some fraction of the yarn diameter.

Another example is U.S. Patent application 2007/0163741 A1 which incorporates an array of compressible sheath/core yarns attached to the backside of a seamed press fabric. It is taught that the sheath is elastomeric, and can provide vibration dampening effects. It further teaches that the yarn core alone can be 200 to 2000 denier, and a total size of 0.30 to 1.2 mm in diameter. Such yarn sizes can be limited in use due to weight and potential marking considerations.

A further example is taught in U.S. Pat. No. 4,350,731 which teaches the use of wrapped yarns to make a compressible press fabric structure. Again the degree of compressibility and recovery is due to only the elastomeric wrapping sheath layers.

Another example of this type of resilient, compressible structure is taught in GB 2 197 886. This patent discloses compressible yarns which alternated in some manner with functional (tensile) load bearing yarns to provide, under an applied normal load, a dense, quasi-single layer base structure without "knuckles" and with long weave floats to provide a quasi-crossless base construction.

Incorporating "elastic" (in the thickness or radial direction) yarns into fabrics has affected to some degree the resiliency or spring back of these fabric structures once the normal load is removed. But again, using these yarns, the compressibility and spring back is limited to some portion of the yarn diameter at most.

As stated above, because of this limited resiliency, press fabrics have a relatively high void volume to handle water when new, more than is ideally required. They will compact and reach an optimum performance level for a period of time. However as they have limited resiliency, they will continue to compact, eventually requiring removal and replacement.

Certain special designs are classified as "crossless" in that the yarns in the MD and CD do not interweave with each other, but are stacked orthogonal to each other and lie in separate planes.

Various techniques have been employed to create such structures. One example of such a structure is taught in U.S. Pat. No. 4,781,967. Such a structure is defined to be relatively incompressible as the stacked yarn arrays do not compress nor move relative to any other layer. In other words, when there is an applied load normal to the plane of the structure, there is little thickness change, except for any yarn deformation which is permanent. If an elastomeric (in the yarn thickness direction) is employed as the yarns in an entire layer, the compressibility of the structure is limited to some portion of that yarn diameter.

Another example of a multilayer crossless structure that has layers of functional MD and CD yarns oriented 90 degrees to each other in separate planes, is taught in U.S. Pat. No. 4,555,440. Again this structure is considered incompressible as there is little through thickness change when a normal load is applied or removed. One embodiment does teach one layer of yarns to be compressible and resilient to add some level of this characteristic to an otherwise incompressible structure.

SUMMARY OF THE INVENTION

Accordingly, it is a principal object of the present invention to provide a base structure that is substantially more compressible and resilient than those of the prior art.

In this regard, the instant invention provides for a base support structure that combines elastomeric (in the length or axial directions) yarns with a unique weave pattern, for use as at least a layer of a base support structure in PMC, industrial process belts, textile finishing belts, and other belts that require a high degree of compressibility and resiliency.

A yarn that is defined as elastomeric in its length or axial direction is required for all the embodiments discussed. The yarn can also be elastomeric in its through thickness direction as well. The yarn can have any form as appropriate for the application and can be, for example, single monofilament, plied monofilament or a multifilament, wrapped yarns of different materials as multicomponent yarns, a knitted yarn, a twisted yarn, and a braided yarn. The yarns can be partially composed of elastomeric material, such as a multicomponent yarn where one component is the elastomeric material, or the yarn can be wholly comprised of the elastomeric material. It can be plied, twisted, knitted or braided. It can have any round or non-round cross sectional shape including square, rectangular, elliptical or polygonal. Examples of good elastomeric materials are polyurethane, rubber or that sold under the trademark Lycra®. The elastomeric yarn can also have a cross-section of any number of differing geometric configurations, including round, non-round, square, rectangular, elliptical, and polygonal.

A first embodiment employs a structure in its simplest form described as follows. Yarn layer (1), which is the uppermost yarn layer, is an array of parallel functional yarns. Functional yarns can include any type of yarn as known by ordinarily skilled artisans. For example, if they are oriented in the machine or running direction, they can be tensile load bearing yarns. They can again be any size, shape, material or form as required for the particular application known to those skilled in the art. For a press fabric structure, polyamide would be a desired polymer choice. The next yarn layer (2) is a parallel array of yarns oriented orthogonal or 90 degrees to the yarn layer (1). These are the required elastomeric yarns. The third layer (3) of yarns is also a parallel array of yarns that are located on the opposite side of layer (2) and are oriented orthogonal to layer (2). However, the yarns in layer (3) are arranged such that each layer (3) yarn lines up with the space between two adjacent layer (1) yarns. These yarn arrays are held together in some manner. For instance, they can be attached to a fibrous layer as taught in the aforementioned U.S. Pat. No. 4,781,967 patent. Or the yarns in one layer can be attached to the yarns in an adjacent layer at the point where they touch via use of glues, adhesives, or a thermal fusion/welding method as known to those skilled in the art.

Note yarn systems (1) and (3) can be the same as each other or they can be different in terms of material, form, shape, etc. It is only required that the yarns in layer (3) are spaced to fit between adjacent yarns of layer (1) or vice versa.

Also note there does not have to be a one to one relationship between the number of yarns of layers (1) and (3), but the number of yarns in layer (3) can be only a fraction of the number of yarns in layer (1) or vice versa. For example, layer (3) may contain only half the yarns of layer (1) so that there are spaces between the yarns of layer (3) in use, creating additional void volume/waterhandling/water removal capability. Another embodiment is the same as that described with woven binder yarns. Batt may then be applied to this structure at least on the sheet contact side by methods known to those skilled in the art.

Accordingly described herein is a compressible resilient industrial fabric that comprises a plurality of substantially parallel cross-machine direction (CD) yarns and a plurality of substantially parallel machine direction (MD) yarns. Any number of the yarns, in either or both of the CD or MD, can include an axially elastomeric material. All the yarns of one layer must be elastomeric, for example, in MD/CD/MD, all the CD yarns must be elastomeric. The fabric can comprise a first layer of the parallel yarns running in either the CD or the MD direction; a second layer of the parallel yarns on one side of the first layer, the second layer's yarns running in the CD or MD direction different from that of the first layer and comprising the elastomeric yarns; and a third layer of the parallel yarns on the opposite of the second layer as the first layer and running in the same direction as those of the first layer. The parallel yarns of the third layer are aligned such that they nest between the spaces created between the parallel yarns of the first layer. The fabric can comprise a binder yarn. In the compressible resilient fabric, the number of yarns in the third layer can be less than the number of yarns in the first layer. The yarns of the second layer can also be orthogonal to those of the first and third layers. In the fabric, the yarns of the second layer can be at an angle of less than 90 degrees of the first and third layer, such as an angle of 45 degrees.

The fabric of can also include a fourth layer of parallel yarns in the same direction as the second layer, which include the elastomeric material, and a fifth layer of parallel yarns in the same direction as the first layer, wherein the yarns of the fifth layer are aligned in the same vertical plane in a through thickness direction as that of the first layer.

In one embodiment the fabric can include a laminated structure. For example, the fabric can comprise two woven layers with an elastomeric layer there between. As another example, the fabric can comprises a binder yarn weaving between the layers of laminate. In another embodiment, the binder yarn and the elastomeric yarn of the fabric can be in the same direction, for example, the CD. In such an embodiment, the layer of elastomeric yarns can be inside a double layer construction.

The resilient compressible fabric can form or be included in any number of final fabrics including: paper machine clothing, a forming fabric, a press fabric, a dryer fabric, a through air dryer fabric, a shoe press belt base, a calendar belt base, an engineered fabric base, a transfer belt base; or a belt used in the production of nonwovens by processes such as airlaid, melt blowing, spunbonding, and hydroentangling. Where the fabric is a base for a dryer fabric, the dryer fabric can include a backside on a nonsheet contact side of the fabric, the backside including angled extrusions.

In another embodiment, the fabric is a compressible resilient industrial fabric, wherein the fabric comprises: a plurality of cross-machine direction (CD) yarns and a plurality of machine direction (MD) yarns. Any number of the MD yarns and CD yarns are interwoven to form a woven fabric. Any number of the yarns are comprised of an axially elastomeric material. The fabric further can include a binder yarn. Also, the fabric can comprise a 2-8-shed pattern. The compressible resilient fabric can woven into any of a flat woven fabric, an endless fabric; and an on-machine seamable fabric. In one embodiment the fabric can include a laminated structure. For example, the fabric can comprise two woven layers with the inventive elastomeric fabric there between. As another example, the fabric can comprises a binder yarn weaving between the layers of laminate. In another embodiment, the binder yarn and the elastomeric yarn of the fabric can be in the same direction, for example, the CD. In such an embodiment, the layer of elastomeric yarns can be inside a double layer construction. The elastomeric yarns composed of a coarser warp; and the binder yarn composed of a warp smaller than that of the elastomeric yarn. Also, the fabric can comprises the elastomeric yarns in the CD and the MD yarns over the elastomeric yarns; wherein the binder yarns are smaller than the elastomeric yarns.

In another embodiment, an interwoven fabric can comprise four ends weaving above the layer of elastomeric yarns and changes to a two-layer binder at every second repeat; and four ends weaving under the layer of elastomeric yarns and changes to a two-layer binder every second repeat. The fabric can also comprise a single layer including the elastomeric yarn, and a functional yarn in the same direction and alternating with the elastomeric yarn, wherein the elastomeric yarn is larger than the functional yarn.

The interwoven resilient compressible fabric can form or be included in any number of final fabrics including: paper machine clothing, a forming fabric, a press fabric, a dryer fabric, a through air dryer fabric, a shoe press belt base, a calendar belt base, an engineered fabric base, a transfer belt base; or a belt used in the production of nonwovens by processes such as airlaid, melt blowing, spunbonding, and hydroentangling. Where the fabric is a base for a dryer fabric, the dryer fabric can include a backside on a nonsheet contact side of the fabric, the backside including angled extrusions.

BRIEF DESCRIPTION OF THE DRAWINGS

Thus by the present invention its objects and advantages will be realized, the description of which should be taken in conjunction with the drawings wherein:

FIG. 1 is a top plan view of a fabric incorporating the teachings of the present invention;

FIG. 2 is a side view of the fabric shown in FIG. 1 in an uncompressed state;

FIG. 8B shows a woven "crossless" base fabric.

FIG. 9 shows a 5-layer compressible resilient fabric comprising a CD binder.

FIGS. 12A-12E show another interwoven variant of the embodied fabric.

DETAILED DESCRIPTION OF THE INVENTION

Figure 4B:
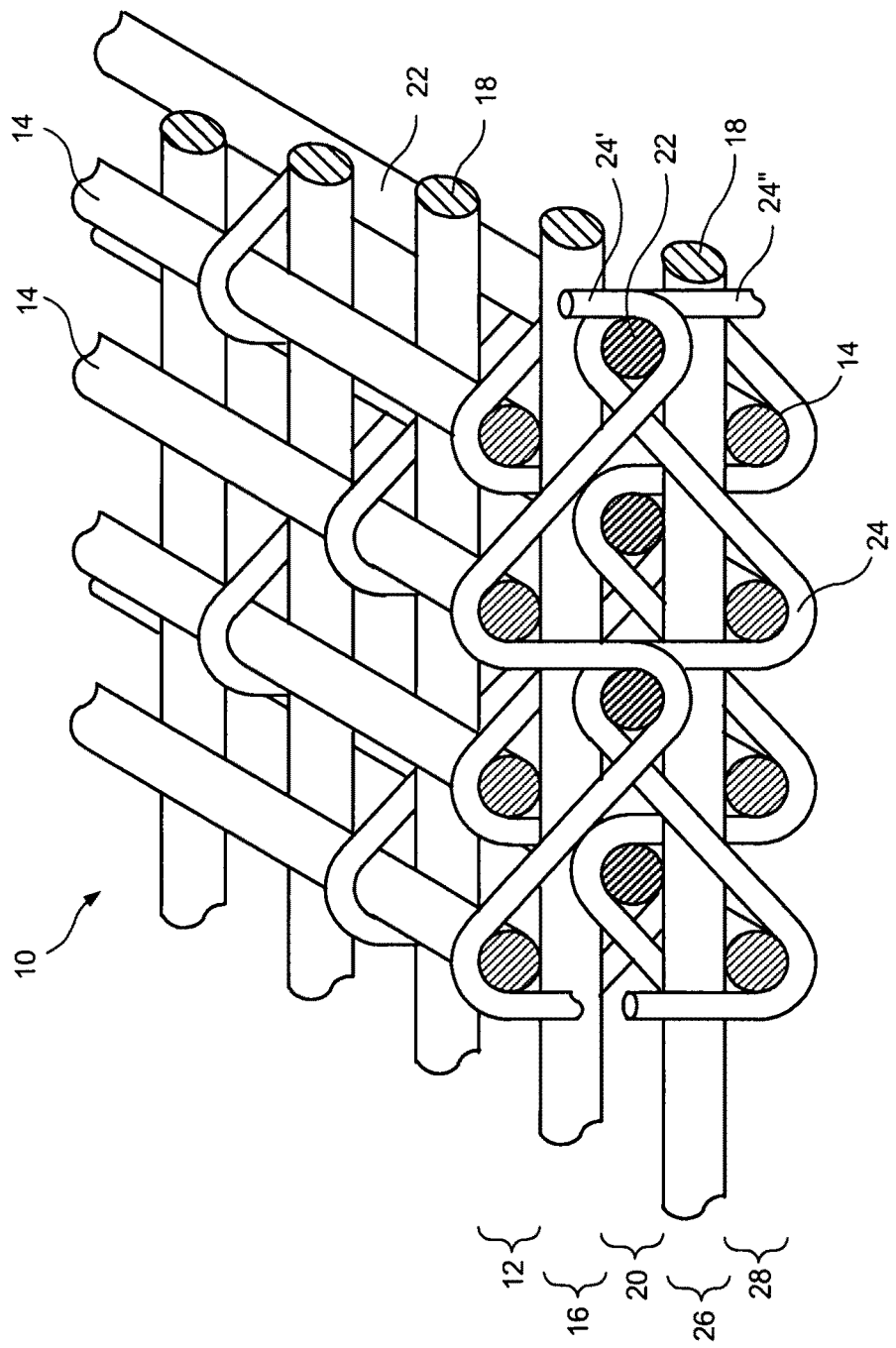
FIG. 4 is a side view of a further embodiment of the inventive fabric.

Initially although a press fabric will be discussed, as aforesaid the present invention has application to other type fabrics or belts including dryer fabrics. With that said turning now more particularly to the drawings, a press fabric 10 is shown for example, having a first or top (1) layer 12 comprised of functional yarns 14 in a parallel array oriented in the machine or running direction. They can be any size, shape, material or form suitable for the purpose. This applies to all the yarns referred to herein.

A second or middle (2) layer 16 of yarns 18 is provided oriented orthogonal or 90 degrees to the first layer 10. The yarns 18 have the elastomeric features as aforesaid.

A third or bottom (3) layer 20 comprised of functional yarns 22 is provided in the form of a parallel array orthogonal to layer 16. The yarns 22 in layer 20 are positioned or aligned with the space between yarns 14.

The yarns of adjacent layers can be attached as aforesaid in a variety of ways suitable for the purpose.

Figure 3:
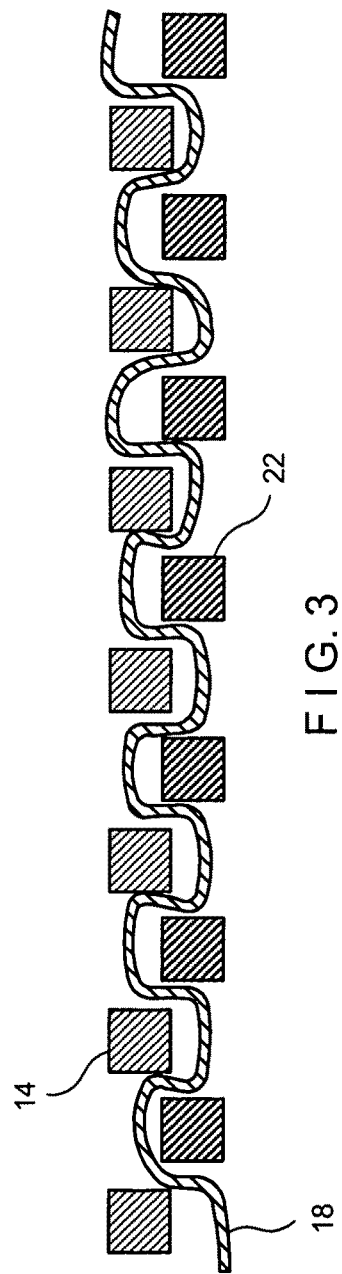
FIG. 3 is a side view of the fabric shown in FIG. 1 in a compressed state.

Upon application of a compressive load as the press fabric 10 enters a press nip on a paper machine, the yarns 18 will stretch allowing the yarns 14 and 22 to move towards each other and to "nest" between each other, virtually almost in the same plane, as shown in FIG. 3. Upon release of the load as the fabric exits the nip, due to the elastic behavior of the yarns 22, they will cause the yarn layers 12 and 20 to move apart from each other or "spring back", returning the fabric to its desired thickness and openness as shown in FIG. 2. Such a structure is therefore compressible and resilient to almost an entire yarn thickness.

These properties are important as they affect: uniformity of pressure distribution under load as well as the total contact area; fast startup as the fabric compresses easily to the desired in nip void volume; vibration dampening as the structure acts as a dampening "spring"; and the quick recovery of thickness may help to minimize rewet during the expansion phase of post mid nip dewatering.

It is important to note that the yarn arrays of layers 12 and 20 can be oriented either in the MD or CD in the fabric in use.

In another embodiment to that of the above, yarn layers 12 and 20 have the same position and relative orientation/spacing as above, but yarn layer 16 is oriented at less than 90 degree angle to layers 12 and 20, preferably at a 45 degree angle.

Another embodiment employs a similar principle as above, but the structure is made using a process as taught in co-pending U.S. application Ser. No. 11/893,874 the disclosure of which is incorporated by reference. A full length, full width array of functional (e.g. tensile load bearing) MD yarns is created according to this method. To this array is attached another layer of the required elastomeric yarns in the CD direction. These CD yarns can be orthogonal or at an angle less than 90 degrees relative to the MD yarns. When the fabric is then folded over according to the method in the application, yarn layers 12 and 20 are formed, sandwiching two layers 18 of elastomeric yarns which are either stacked perpendicular and on top of each other, or crisscross each other an acute angle. The spacing of the MD yarns after folding over has to be arranged to allow the yarns to "nest." When used as a press fabric, additional batt fiber can be attached to at least one surface to further consolidate the structure.

In another embodiment, a structure is woven similar to that taught in the aforementioned U.S. Pat. No. 4,555,440, the disclosure of which is incorporated by reference. For purposes of illustration, only two layers of yarns in one direction 12 and 20, and one layer 16 of yarns in the other orthogonal direction 16 are shown in FIG. 1. The structure is held together with woven in binder yarns 24 as shown in FIG. 1. Note that such woven-in binder yarns can be either the MD or the CD. Yarn layers 12 and 20 are functional yarns. If they are MD yarns, one or both layers can be tensile load bearing yarns. They can be the same or different from each other in shape, form, material, etc. Layer 16 is the elastic yarns. Again, the spacing of yarns 14 and 22 relative to each other has to be such to allow "nesting". Binder yarns 24 can act just as binder yarns or also be functional yarns as well which for example can positively affect CD fabric stability. As in the other embodiments above when used as a press fabric for example, batt can be applied at least to one surface to enhance fabric integrity at least. Also depending on the application instead of batt a microporous film may be laminated to the structure.

When a load is applied normal to the fabric plane, yarn layers 12 and 20 will move towards each other and "nest", allowing compression of the base fabric to almost a full yarn diameter. More importantly, as the load is removed, the elastic yarns 18 will "spring back", causing yarn layers 12 and 20 to move apart from one another.

Furthermore, as drawn in the '440 patent, there can be more than two layers of functional MD yarns and more than one layers of CD yarns as shown in FIG. 4A. With three layers of MD yarns for example, two of the three yarn layers must be spaced apart relative to each other to allow nesting. For example, top and middle layers can be oriented such that yarns in the middle layer fit in the space between two adjacent yarns of the top and yarns in the bottom layer are stacked in vertical orientation with either the top or middle layers. Furthermore, two layers of CD yarns can be elastomeric, or only one layer can be and the other layer can be a functional yarn layer to aid in CD stability or to provide a greater degree of void volume under load. Again yarns in the top, middle and bottom layers can be the same or different from each other in form, material, shape, etc.

Another variant of the "crossless" woven structure is shown at FIG. 4B, in which the fabric 10 is shown comprising five layers in generally parallel planes with each layer comprising a plurality of parallel yarns. The yarns of the first, third and fifth layer (i.e. layers 12, 20 and 28) are oriented in the machine direction while the yarns of the second and fourth layers (i.e. layers 16 and 26) are oriented in the cross-machine direction. As shown therein, MD functional yarns 22 in the third layer 20 are spaced apart in the manner described above such they fall between the yarns 14 of the first layer 12 and the fifth layer 28. The second layer 16 and the fourth layer 26 include the elastomeric yarns 18. The binder yarns 24 are disposed in the CD.

The layers are not interwoven. One or more relatively thin threads 24 are used to bind the layers vertically together. For example two threads, 24' and 24" may be used to bind the yarns of the center or middle layer to the top and bottom layers respectively. This type of construction insures that the individual yarns of the layers do not shift laterally. Binder yarns 24' and 24" can alternate from one row to another, each row extending in a cross-machine direction.

The same types of structure above can be employed to produce the spiral wound strips of material to produce a structure as taught in U.S. Pat. No. 5,360,656.

All the structures above can be made endless in the machine direction. They can also have a seam to allow on machine seaming capability. One method to make such a seam in "crossless" structures is taught in U.S. Pat. No. 4,979,543.

Again it is important to note that the elastomeric yarn can be employed in either the MD or CD layers, or in both MD and CD layers, as long as there is at least one MD layer of tensile load bearing yarns to provide adequate strength and stretch resistance to the structure in use.

Also the degree of compression/resiliency is controlled by the elasticity of the required yarns, size and number of yarns, number of layers of the yarns, and of course the totality of the structure itself. The inventive structure can also be part of a laminate with other yarn arrays or base fabrics attached.

Figure 5:
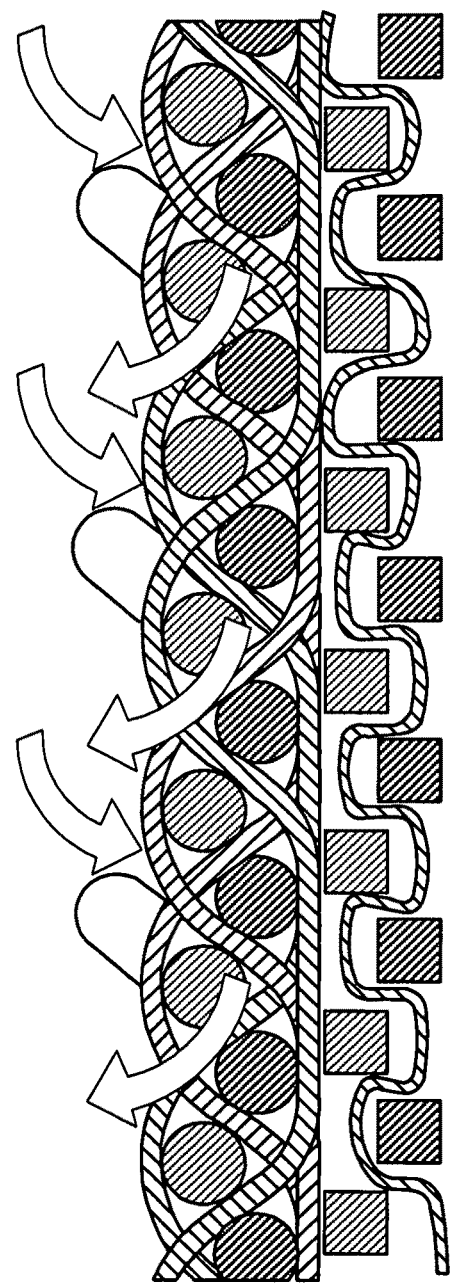
FIG. 5 is a dryer fabric, according to a further embodiment of the invention.

Moreover, in the case of a dryer fabric, the three layer embodiment, shown in the figures, may be particularly advantageous in that as the fabric structure passes around a roll, for example a dryer can, the yarns in the dryer fabric will at least partially nest improving contact area of the paper sheet to the dryer can surface and therefore improve heat transfer. This would be caused by a temporary increase in MD tension as the dryer fabric passes around a roll and not due to any applied load normal to the fabric. The invention, according to another embodiment, is a support layer of a dryer fabric, where the inventive fabric forms the sheet side component of the dryer fabric, such as shown in FIG. 5. In this fabric, the "angled" or backside is the nonsheet contact side of the fabric. This side "chops up" laminar flow and induces "vertical flow" in the dryer pocket, and reduces axial (to the side) or CD direction air flow, and helps mass transfer. In such an arrangement, the support fabric compresses on the dryer can to spread its surface, increasing sheet contact area with the can and therefore improves heat transfer. Therefore, the embodiment forms an improved dryer fabric with an engineered sheet side for heat transfer promotion and optimization, and engineered backside for mass transfer promotion and optimization. The structure can be an integrally woven structure, a laminate or a combination of both.

In yet another embodiment, the layers of a fabric may each be formed by mixing different weave repeats or shed patterns. By way of background, in float weaving, a warp, or MD, yarn is threaded through a heddle, and the weave pattern is created by raising and lowering the heddle position for each yarn in the warp direction before the shute or pick is inserted into the shed created by raising or lowering the warp yarns or MD yarns. The number of yarns intersected before a weave pattern repeats is known as a shed, or harness. With this understanding, a plain weave utilizes, for example two sheds in a loom for changing the warp yarn positions, and can therefore be termed a two shed weave pattern. Accordingly a fabric can be comprised of a 2, 4, 6 or 8 shed pattern, and so on.

Figure 6:
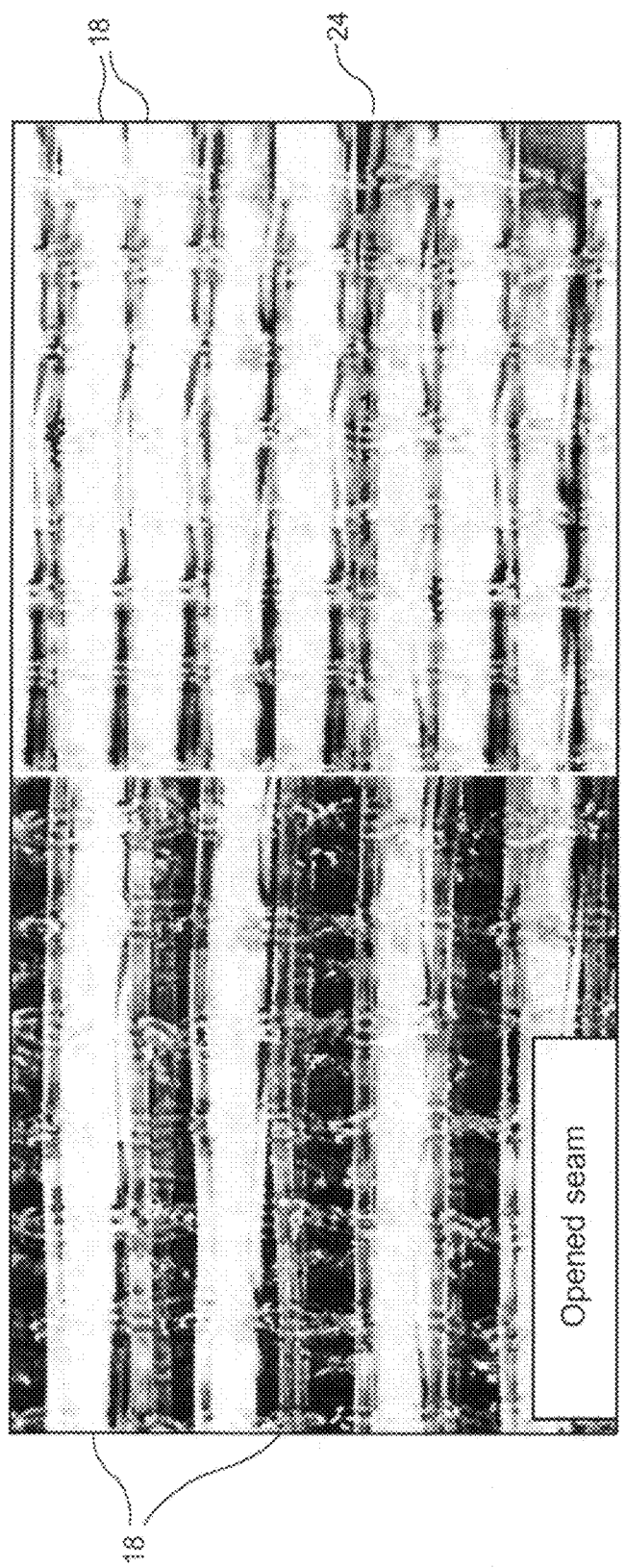
FIG. 6 is top view of another embodiment of the invention.

FIG. 6 shows a 2-shed pattern with a 0.35 mm MD yarn; the figure showing two differing densities for the elastomeric yarn 18 and the binder yarn 24. For weaving a 2-shed surface for, for example, a 5-layer fabric with an elastomeric yarn 18, a 16 harness (16/4=4, 4/2=2 shed) pattern can be used. In one exemplary fabric, the top pattern can be a 2-shed for the loop yarns for an on-machine seamable version of the fabric. The pick count for the loop yarn in 2-shed can be the same as that in, for example, 4-shed patterns, in order to maintain the loop strength. In another example, a 2-layer, 4/8-shed weave can have a 4 ply Lycra® yarn as a shute.

Figure 7:
FIG. 7 illustrates another embodiment showing a multi-component wound yarn comprising elastomeric material for a fabric having a 2 layer construction.
Figure 8A:
FIGS. 8A-8B shows embodiments of a laminated fabric.

Illustrating other embodiments of the fabric, in FIG. 7 is shown a multi-component wound yarn comprising elastomeric material 16 for a fabric having a 2 layer construction. In FIG. 8 are shown embodiments of laminated structures of the fabric. FIG. 8A shows a base fabric with the elastomeric yarn 18 and functional yarns 14, 22 laminated between two fabrics.

Figure 8B:

FIG. 8B shows a woven "crossless" base. The base shows the elastomeric yarn 18 and the functional yarns 14 and 22 as well as a binder yarn 24. Also contemplated are other embodiments where the elastomeric yarn can be a knitted yarn instead of a ply twisted yarn.

In another embodiment, FIG. 9 shows a 5-layer compressible resilient fabric comprising a CD binder 24. The yarn array 16 including the elastomeric yarn 18 running in the CD is positioned between the first yarn array 12 and the third yarn array 20. A fourth layer 26 including elastomeric yarns 18 has the yarns positioned such that they are in alternating spaces in the vertical plane from the parallel elastomeric yarns of the second layer 16. The yarns 14 of the fifth layer 28 are in the same vertical plane as the yarns 14 of the first layer 12. As shown in the figures, each CD binder yarn 24 alternately weaves under and over three parallel yarns in the first and fifth layers, and is spaced in the MD such that long floats are created by each of the yarns 12 of the first layer 12 and the fifth layer 28. As shown, the elastomeric yarns are inside a double layer weave construction, which can use 16 harness as for endless weaving or an 8 harness weave for flat weaving. The fabric woven in accord with the embodiment can use the single monofilament warp yarns as 4 ply yarn types. It is also possible to use two different warp yarns, a coarser warp including the elastomeric yarn 18, and a smaller warp for the binder yarn 24. A fabric as shown in FIG. 9 was used with two separate warp beams. However, if two warps are not desired, the fabric can also be configured to include a small binder yarn with elastomeric warp yarns and the MD yarns woven over the elastomeric warp yarns.

The weave must be such that the elastomeric yarns are allowed to stretch and the base compresses under a normal load then 'springs back' after removal of the load.

Figure 10:
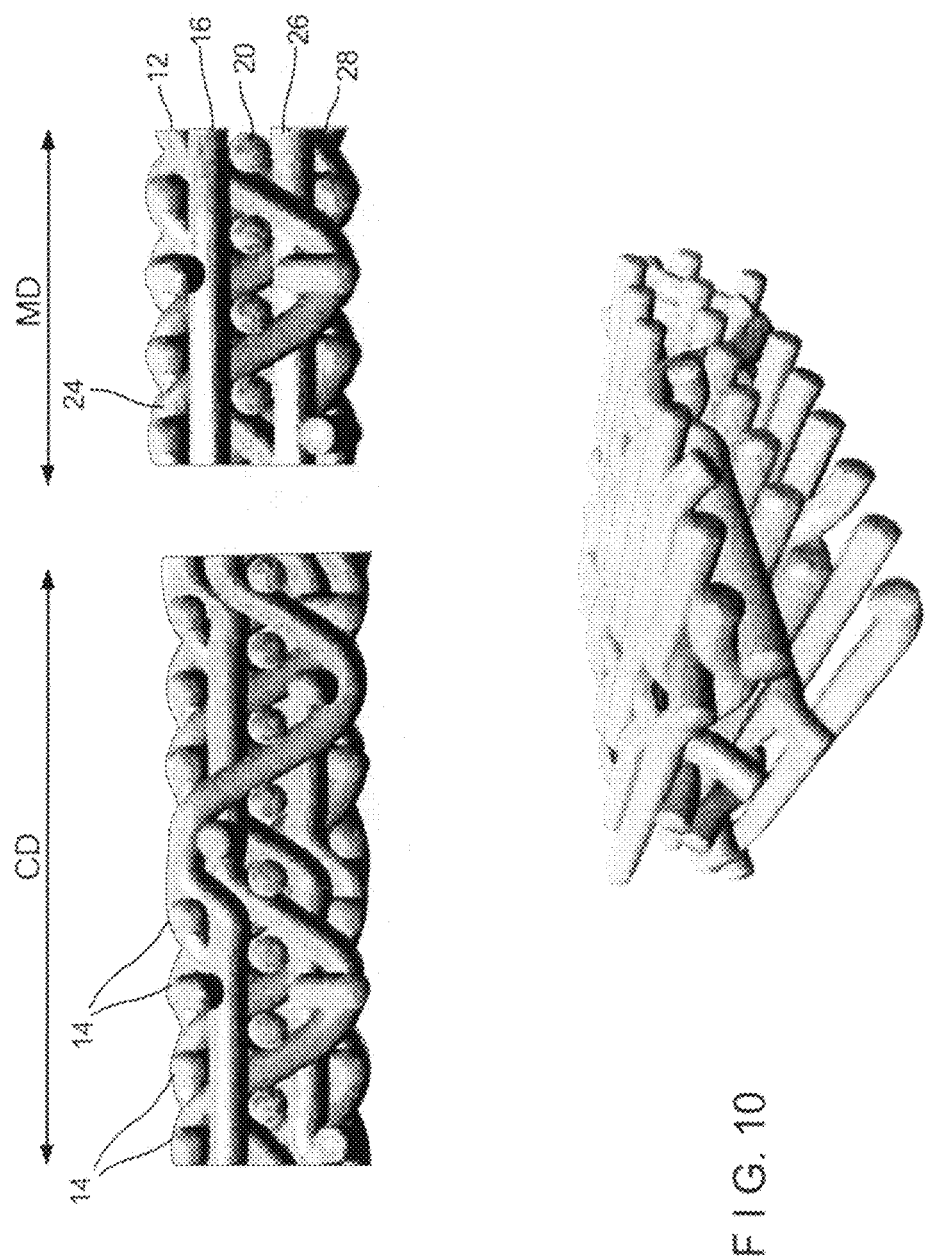
FIG. 10 illustrates another embodiment of the fabric.
Figure 11A:
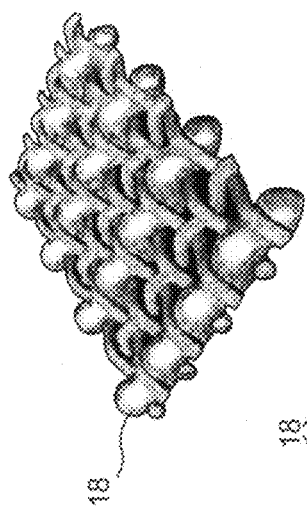
FIGS. 11A-11E show an interwoven embodiment of the fabric.
Figure 11B:
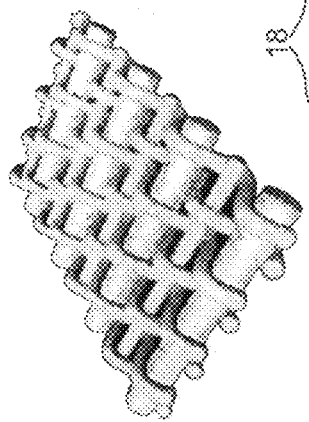
Figure 11C:
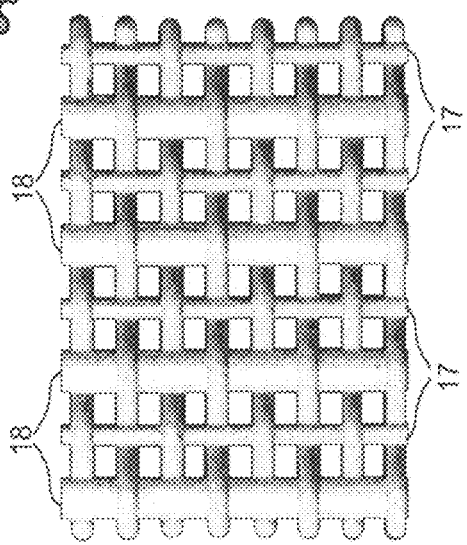
Figure 11D:
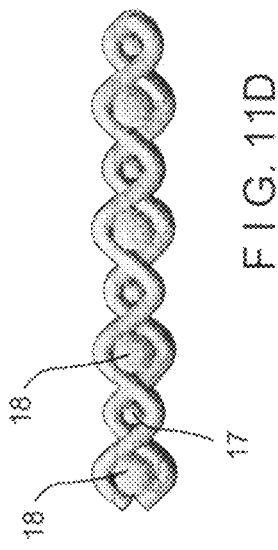
Figure 11E:
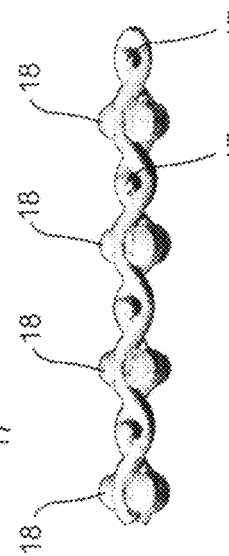

FIG. 10 illustrates another embodiment including a weaving in of the warp yarns. As shown therein four ends of yarns 14 the first layer 12 weave above the layers 16, 20, 26 of elastomeric yarns 18, and changes over to a two-layer binder every second repeat, and four ends of yarns 14 weaving under the layers 16, 20, 26 and changes over to a two-layer binder every second repeat. Each layer need not be composed of elastomeric yarns. Rather yarns may or may not be present depending upon the compressibility desired.

FIG. 11 shows yet another embodiment. FIGS. 11A, 11C and 11D show an uncompressed state, whereas 11B and 11E show a compressed state. In the Figures, a single layer includes elastomeric yarns 18, here shown as elastomeric shutes 18, and functional yarns 17 in the same direction and alternating with the elastomeric yarns 18. The elastomeric yarn is larger than the functional yarn 17. As shown, the elastomeric yarns 18 and functional yarns 17 can be in the MD; the fabric layer could also be adapted to include the larger elastomeric yarns 18 in a warp direction, as, for example, in a multiaxial fabric. As shown by, inter alia, the comparison at FIGS. 11D and 11E, the fabric is rendered compressible and resilient, even with a single layer construction. Also, by manipulating the shute and warp tensions, straighter CD yarns crossing the elastomeric yarns can be achieved.

Another variant of the embodied fabric is shown at FIGS. 12A-12E, configuring the fabric with more or less MD crimp weaves, and having the elastomeric yarns in the interior layers. The Figures show three layers 12, 16, 20, of elastomeric yarns 18; a top layer 12 and bottom layer 20 running in the CD and a middle layer 16 arrayed lengthwise in the MD. Loop or binder yarns 24 (for a on-machine seamable) run or weave through the structure as illustrated, where on the uppermost surface the yarns 24 extend over two of the top CD layer 12 elastomeric yarns and thread downward to loop under a single CD elastomeric yarn 18 in the bottom layer 20 of arrayed elastomeric yarns, whereupon it threads upward again. As shown, the binder yarns 24 are formed with a crimp 30.

In both FIGS. 11 and 12, again the weave and placement of the elastomeric yarn must be such that elastomeric yarns upon a normal load being applied to the base fabric, the base fabric compresses and 'springs back' upon removal of the load.

Modifications to the present invention would be obvious to those of ordinary skill in the art in view of this disclosure, but would not bring the invention so modified beyond the scope of the appended claims.

The invention claimed is:

1. A compressible resilient industrial fabric having an original thickness, wherein the fabric comprises:
    a laminated structure comprising
    a plurality of substantially parallel cross-machine direction (CD) yarns;
    a plurality of substantially parallel machine direction (MD) yarns;
    a first layer of the parallel yarns running in either the CD or the MD direction;
        a second layer of the parallel yarns on one side of the first layer, the second layer yarns running in the CD or MD direction different from that of the first layer and comprising a plurality of elastomeric yarns; and
    a third layer of the parallel yarns on the opposite side of the second layer as the first layer and running in the same direction as those of the first layer,
    wherein the parallel yarns of the third layer are aligned such that the parallel yarns of the third layer nest between the parallel yarns of the first layer without interfering with one another to allow the fabric to compact to form a planar structure in a through thickness direction when the fabric is under a compressive load,
    wherein the elastomeric yarns are elastic in their thickness or radial direction and length or axial direction such that under the compressive load the elastomeric yarns stretch and
    compress to conform to the nesting and the fabric springs back to substantially the original thickness after removal of the load, and
    wherein the fabric is formed in an endless structure in the form of a continuous loop.

2. The fabric of claim 1 wherein the number of yarns in the third layer is less than the number of yarns in the first layer.

3. The fabric of claim 1 wherein the yarns of the second layer are orthogonal to those of the first and third layers.

4. The fabric of claim 1 wherein the fabric comprises:
    a fourth layer of parallel yarns in the same direction as the second layer, the yarns comprising the elastomeric material; and
    a fifth layer of parallel yarns in the same direction as the first layer, wherein the yarns of the fifth layer are aligned in the same vertical plane in a through thickness direction as that of the first layer.

5. The fabric as claimed in claim 1, wherein the elastomeric yarn is selected from the group consisting of: a monofilament, a multifilament, a plied monofilament, a wrapped yarn, a knitted yarn, a twisted yarn, a multicomponent yarn, and a braided yarn.

6. The fabric as claimed in claim 1, wherein the elastomeric yarn is selected from the group consisting of: a polyurethane and rubber.

7. The fabric as claimed in claim 1, wherein the elastomeric yarn is selected from yarns having a cross-section of differing geometric configurations.

8. The fabric as claimed in claim 7, wherein the elastomeric yarn is selected from the group consisting of: round, non-round, square, rectangular, elliptical, and polygonal.

9. The fabric of claim 1 wherein the fabric is selected from the group of fabrics including:
    paper machine clothing
    a forming fabric;
    a press fabric;
    a dryer fabric;
    a through air dryer fabric;
    a shoe press belt base;
    a calendar belt base;
    an engineered fabric base;
    a transfer belt base; and
    a belt used in the production of nonwovens by processes such as airlaid, melt blowing, spunbonding, and hydroentangling.

10. The fabric of claim 1 wherein the fabric is a base for a dryer fabric, whereby the dryer fabric further includes;
    a backside on a nonsheet contact side of the fabric, the backside including angled extrusions.

* * * * *